(12) United States Patent
Blanc

(10) Patent No.: US 12,717,100 B2
(45) Date of Patent: Aug. 25, 2026

(54) ACTIVE OPTICAL CABLES

(71) Applicant: NORTECH SYSTEMS, INC., Maple Grove, MN (US)

(72) Inventor: Scott G. Blanc, Bemidji, MN (US)

(73) Assignee: NORTECH SYSTEMS, INC., Maple Grove, MN (US)

(*) Notice: Subject to any disclaimer, the term of this patent is extended or adjusted under 35 U.S.C. 154(b) by 115 days.

(21) Appl. No.: 18/263,121

(22) PCT Filed: Jan. 26, 2022

(86) PCT No.: PCT/US2022/013938
§ 371 (c)(1),
(2) Date: Jul. 26, 2023

(87) PCT Pub. No.: WO2022/164926
PCT Pub. Date: Aug. 4, 2022

(65) Prior Publication Data

US 2024/0126029 A1 Apr. 18, 2024

Related U.S. Application Data

(60) Provisional application No. 63/141,866, filed on Jan. 26, 2021.

(51) Int. Cl.
*G02B 6/42* (2006.01)
*G02B 6/12* (2006.01)

(52) U.S. Cl.
CPC ......... *G02B 6/4292* (2013.01); *G02B 6/4206* (2013.01); *G02B 6/4277* (2013.01); *G02B 6/4281* (2013.01); *G02B 2006/12121* (2013.01)

(58) Field of Classification Search
CPC .. G02B 6/4292; G02B 6/4281; G02B 6/4206; G02B 6/4277
See application file for complete search history.

(56) References Cited

U.S. PATENT DOCUMENTS

2016/0223768 A1* 8/2016 Logan, Jr. ............ G02B 6/3871
2018/0284373 A1* 10/2018 Lin ..................... G02B 6/4277

(Continued)

OTHER PUBLICATIONS

International Search Report and Written Opinion mailed Apr. 26, 2022 for International Patent Application No. PCT/US2022/013938, 8 pages.

(Continued)

*Primary Examiner* — Michael P Mooney
(74) *Attorney, Agent, or Firm* — Morgan, Lewis & Bockius LLP

(57) ABSTRACT

In one embodiment, an opto-electronic assembly includes a housing having a cavity and an opto-electronic module disposed at least partially in the cavity of the housing. The housing is configured to support an electrical connection at a first end of the housing and support an optical connection at a second end of the housing. The opto-electronic module includes an opto-electronic transceiver, an electrical interface to provide an electrical connection to the opto-electronic module via the first end of the housing, a ferrule, and a lens, wherein the ferrule and the lens are to provide an optical connection to the opto-electronic module via the second end of the housing. The housing, the opto-electronic module, the opto-electronic transceiver, the electrical interface, and the ferrule have a magnetic permeability that is less than 1.0 B/H, where B is magnetic flux density and H is magnetic flux.

20 Claims, 8 Drawing Sheets

(56) References Cited

U.S. PATENT DOCUMENTS

2020/0003973 A1* 1/2020 Li ........................ G02B 6/4214
2020/0174205 A1* 6/2020 Kubo ..................... H05K 1/181
2020/0333541 A1 10/2020 Wood et al.

OTHER PUBLICATIONS

First Examination Report in Indian Application No. 202317053649 dated Sep. 9, 2025, 7 pages, including translation.

* cited by examiner

ACTIVE OPTICAL CABLES

PRIORITY CROSS REFERENCE TO RELATED APPLICATIONS

This application is a U.S. National Phase Patent Application of International Patent Application No. PCT/US2022/013938 filed Jan. 26, 2022 entitled "Active Optical Cables" which claims priority to U.S. Provisional Patent Application No. 63/141,866 filed Jan. 26, 2021 entitled "Active Optical Cables", all of which is incorporated by reference herein in its entirety.

TECHNICAL FIELD

The present disclosure is generally related to the field of active optical products (e.g., cabling systems and assemblies, etc.) and, more particularly, to active optical products including components that are non-magnetic.

BACKGROUND

Data rates have increased between modules, at least in the avionics field, due to a desire to provide for high-definition digital video for in-flight entertainment systems, cockpit displays, AFDX (Avionics Full Duplex Switched Ethernet) interconnect protocol and the like. Accordingly, avionics systems and aircraft manufacturers hope to take advantage of the extremely high bandwidth and light weight, ease of routing, and immunity to electromagnetic interference (EMI) offered by the optical fiber transport medium. There is a need, therefore, for avionics rack assemblies and associated modules to accommodate fiber optic connections, e.g., with active optical components, therebetween. One approach that has been taken on the module side in such systems employs an optical converter component inside of the module, which is mounted on a (fixed or flexible) printed circuit board. The foregoing example of avionics modules is intended to be non-limiting, and it is noted that the problems described herein with realizing fiber-optic interfaces in electronics modules pertain to application in many other fields, and the usefulness of the embodiments described herein is therefore not limited to the avionics industry.

SUMMARY

In one embodiment, an opto-electronic assembly includes a housing having a cavity and an opto-electronic module disposed at least partially in the cavity of the housing. The housing is configured to support an electrical connection at a first end of the housing and support an optical connection at a second end of the housing. The opto-electronic module includes an opto-electronic transceiver, an electrical interface to provide an electrical connection to the opto-electronic module via the first end of the housing, a ferrule, and a lens, wherein the ferrule and the lens are to provide an optical connection to the opto-electronic module via the second end of the housing. The housing, the opto-electronic module, the opto-electronic transceiver, the electrical interface, and the ferrule have a magnetic permeability that is less than 1.0 B/H, where B is magnetic flux density and H is magnetic flux.

BRIEF DESCRIPTIONS OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present disclosure is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has been adopted with the intent of facilitating the reader's understanding and is not intended as being limiting. Further, the figures are not to scale for purposes of illustrative clarity.

The active optical cable (AOC) apparatuses and systems described in this disclosure include a nonmagnetic pluggable active optical transceiver product. Such a AOC product may include opto-electronic converter modules integrated with configurable cabling. Further, a AOC product maintains engagement of the optical interface and features removable insertion features that facilitate engagement, indexing and alignment with the mating interconnecting devices. In various embodiments, the AOC product includes electronics-embedded optical components designed to convert electrical to optical signals or vice-versa. Various components of the AOC product may include metal components, one or more of which may have a magnetic permeability value at which the respective metal components are considered non-magnetic. Further, the AOC product may include or provide a digital interface that allows real time access to device operating parameters, and includes a system of alarm and warning flags which alerts the host system when operating parameters are outside of normal operating range (factory set).

As an example, the AOC product or assembly provided in this disclosure is deployed in an electronic rack assembly used in the avionics field. An electronic rack assembly can define one or more positions each of which is configured for receiving a module. The rack assembly can include a connection back plane such that each module can include a complementary connection arrangement that blind-mates to the connection back plane when each module is installed. In this way, a large number of interface connections can simultaneously be made or broken such that each module can be conveniently installed and/or replaced.

Figure 1:
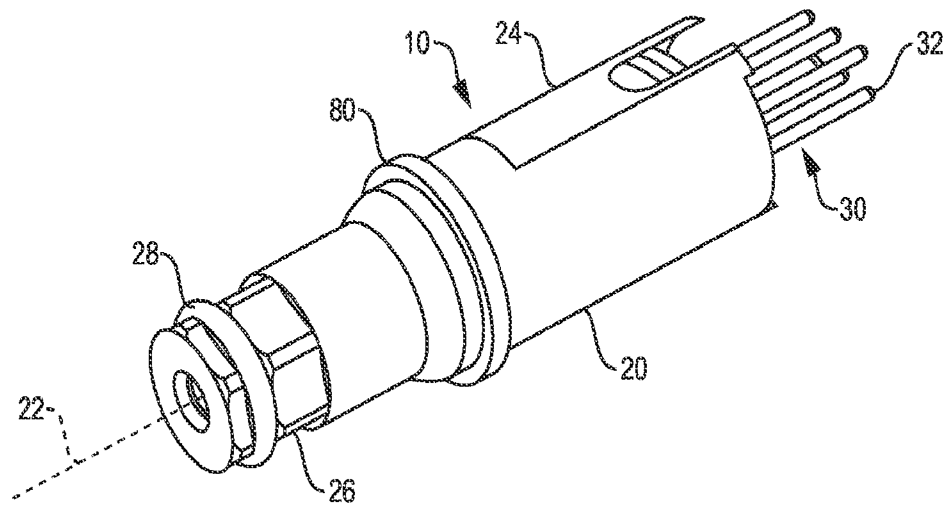
FIG. 1 is a diagrammatic view, in perspective of an embodiment of an opto-electronic contact that is produced according to the present disclosure.

Turning now to the figures wherein like components may be designated by like reference numbers throughout the various figures, attention is immediately directed to FIG. 1 which is a diagrammatic view, in perspective, illustrating an embodiment of an opto-electronic contact or an AOC assembly, generally indicated by the reference number 10 (note the terms "opto-electronic contact," "contact," and "AOC assembly" are used interchangeably in this disclosure). Contact 10 can be either a transmitter optical subassembly (TOSA) or a receiver optical subassembly (ROSA). In the instance of the former, the contact can include, for example, a laser diode (e.g., a vertical-cavity surface-emitting laser (VCSEL)) and associated drive electronics while, in the instance of the latter, the contact can include, for example, a photodiode and associated electronics. In some embodiments, contact 10 is in a hot-pluggable network interface module form, e.g., as a small form-factor pluggable (SFP) or SFP+module.

Generally, contact 10 can include a barrel housing 20 having an elongated length that can define an elongation axis 22 that is illustrated by a dashed line. The housing can be formed having indexing features such as, for example, one or more flats 24 for use in embodiments that benefit from indexing of the rotational orientation, as will be further discussed. While the housing and overall contact 10 may be described below in terms of satisfying the standards to meet a particular type of specification, it should be understood that the assembly can be configured to satisfy any suitable connector specification, either currently in existence or yet to be developed. Housing 20 can be configured to receive an alignment sleeve retainer cap 26, for example, using threaded engagement and having an O-ring groove that receives an O-ring 28. An opposing end of housing 20 can support an external electrical connection interface 30 which, in the present example, includes an arrangement of electrically conductive pins 32. As will be seen, pins 32 can be arranged in any suitable geometric pattern. In other embodiments, electrical interfacing can be accomplished using suitable expedients other than electrically conductive pins. In the embodiment of FIG. 1, straight electrical pins are shown for clarity, but it is noted that some or all of the pins may be replaced with other high-speed electrical interconnection means, such as coax, twinax, or quadrax interconnections, or a flexible circuit board, as appropriate for the signal type being transmitted.

In some embodiments, one or more components of assembly 10, e.g., housing 20, flats 24, cap 26, O-ring 28, interface 30, pins 32, may be or include a metal. Any metal components of contact assembly 10 may be composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components of assembly 10 a may have a magnetic permeability (μ) that is non-magnetic (e.g., a value of less than 1.0 B/H (or less than about)). As used herein, magnetic permeability μ may refer to the degree of magnetization of material in response to a magnetic field. Magnetic permeability may be the ratio of magnetic flux density B and magnetic flux H, such that a value of less than 1.0 is non-magnetic and a value equal to or more than 1.0 is magnetic. The physical constant μ0 may be the magnetic permeability in vacuum. Relative permeability μr may be the ration of μ and μ0. Further, non-magnetic components may be treated using passivation processes to create a microcoating protection against corrosion. AOC assembly may employ a number of printed circuit board (PCB) technologies applicable to creating non-magnetic solutions including but not limited to hot air surface level (HASL), electroless nickel immersion gold (ENIG), copper palladium immersion gold (CPIG), immersion silver (IS) and organic solder preservation (OSP) processes.

Figure 2:
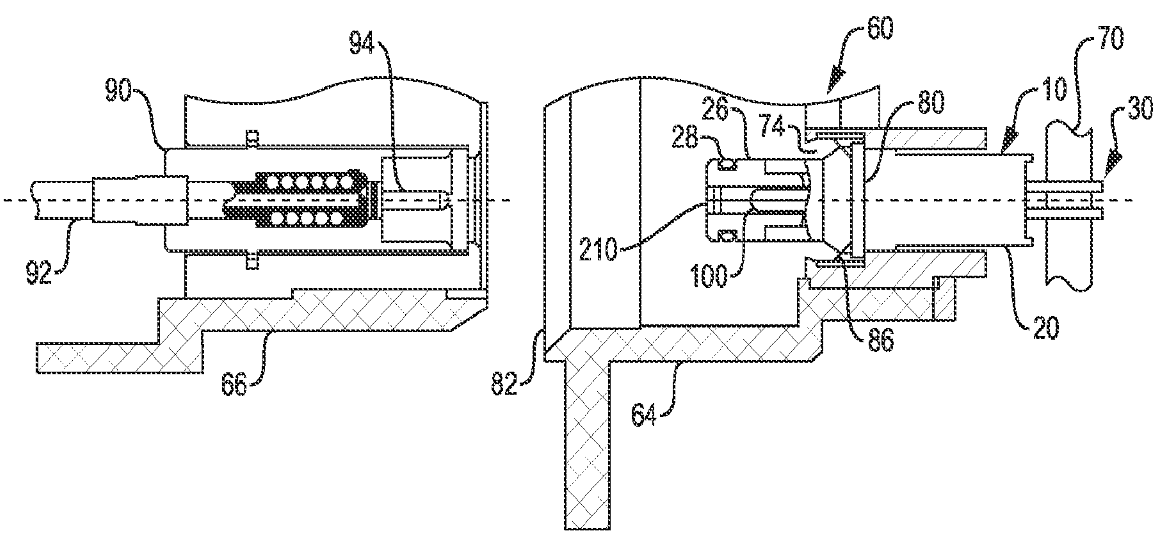
FIG. 2 is a diagrammatic, partially cutaway view, in elevation, of an embodiment of a standard connector system supporting the opto-electronic contact of FIG. 1 for blind mating with an opposing connector.

Referring to FIG. 2, in conjunction with FIG. 1, the former is a diagrammatic, partially cutaway view that illustrates a standard connector system, generally indicated by the reference number 60, which is suitable, by way of non-limiting example, for use in the avionics and aerospace industries. In particular, system 60 can conform to the well-known ARINC 600 standard and includes a receptacle connector 64 that defines three bays (not shown) for purposes of receiving inserts that can support electrical and/or optical interconnections, even though the original intent of the standard was to support electrical interconnections. According to the standard, a plug connector 66 can be received in each bay of receptacle connector 64, by way of blind mating, having the receptacle connector mounted on a module and plug connector 66 mounted in a bay of a rack assembly. In the present example, receptacle connector 64 can support a plurality of opto-electronic contacts or AOC assemblies 10, only one of which is shown. In an embodiment, one insert in the receptacle connector can support eleven instances of opto-electronic contact 10. Electrical connection interface 30 of each contact can be electrically connected, for example, to a printed circuit board 70 that can be located in a module such as an avionics module. Contact 10 is received in a cavity 74 which can be referred to, in the present example, as a size-8 cavity that can comply with the ARINC 801 standard. As noted above, this standard pertains to passive optical connectors for blind-mate interfaces having a diameter of approximately 8 mm. Opto-electronic contact 10 includes an annular shoulder 80 that is seatable against an annular floor within the receptacle cavity. The contact can be inserted from a front or exterior side 82 of receptacle connector 64 (i.e., "front-release" type) such that an annular retention clip 86 removably snaps into position over shoulder 80 to retain the contact within the receptacle cavity. Other connector types can also make use of this type of contact, in either front-release or rear-release configurations.

Still referring to FIG. 2, plug connector 66 defines a cavity that can receive, by way of non-limiting example, an opposing contact 90. The opposing contact can be optical or opto-electronic. An opposing optical contact can be "passive", as in an optical fiber ferrule. An opposing opto-electronic contact can be "active", incorporating electronics and/or opto-electronic devices, for example, as taught herein. In the present example, the opposing contact supports a fiber optic cable 92 that is terminated by a ferrule 94 to support an optical fiber such that the ferrule tip can be directly biased in physical contact against an opposing ferrule tip to provide for optical communication between two optical fibers as detailed, for example, in ARINC 801. It should be appreciated that, while contact 90 can be characterized as a fiber optic contact, a wide variety of physical outlines and/or standards can be employed for contact 90 while remaining within the scope of the present disclosure so long as the contact is configured for optical engagement. In some embodiments, contact 90 can be an active contact which can even be produced according to the teachings that have been brought to light hereinafter. In the present example, contact 90 is configured to engage an opposing ferrule in receptacle connector 64 that is identified by the reference number 100 and is provided as part of contact 10, as will be further described. For the moment, it is sufficient to note that ARINC 801 sets forth details relating to the positional relationship between the opposing ferrules as the opposing contacts are partially engaged and then reach full engagement. Other specifications, such as MIL-T-29504, MIL-C-28876 and others also describe similar detailed relationships between the opposing ferrules in optical contacts. In the present example, ferrule 100 does not form part of a passive fiber optic connection but rather forms part of opto-electronic contact 10, as will be further described, with respect to subsequent figures.

In some embodiments, one or more components illustrated in FIG. 2, e.g., connector 64, plug connector 66, printed circuit board 70, clip 86, contact 90 (and components therein), ferrule 94, ferrule 100, may be or include a metal. Any such metal components may be composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components may have a magnetic permeability that is non-magnetic (e.g., a value of less than 1.0 B/H (or less than about)). Further, nonmagnetic components may be treated using passivation processes to create a microcoating protection against corrosion. AOC assembly may employ a number of PCB technologies applicable to creating nonmagnetic solutions including but not limited to hot air surface level (HASL), electroless nickel immersion gold (ENIG), copper palladium immersion gold (CPIG), immersion silver (IS) and organic solder preservation (OSP) processes.

Figure 3:
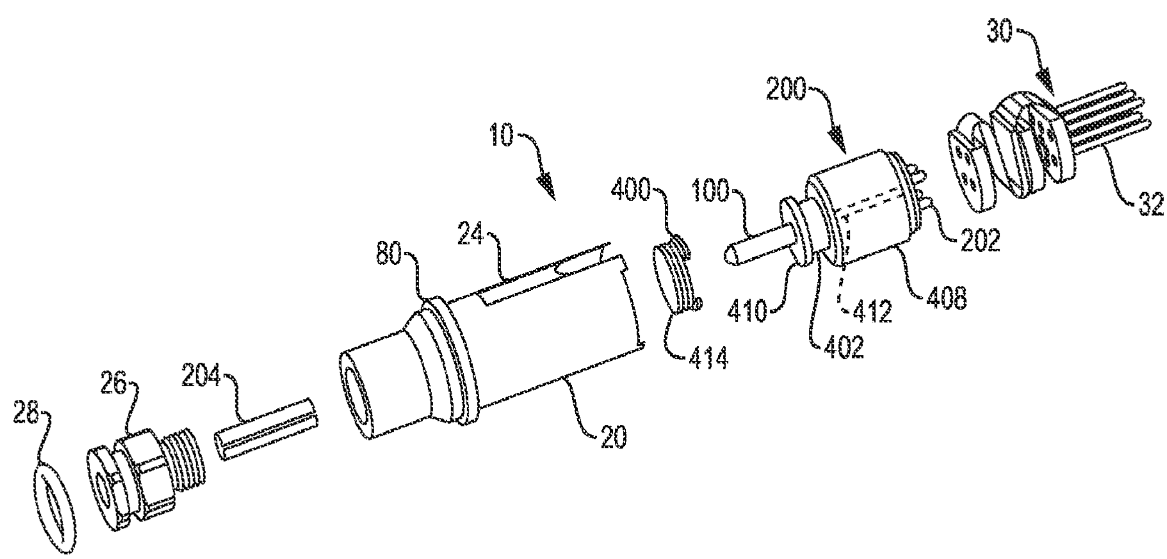
FIG. 3 is a diagrammatic exploded view, in perspective, of an embodiment of contact 10 of FIG. 1.
Figure 4:
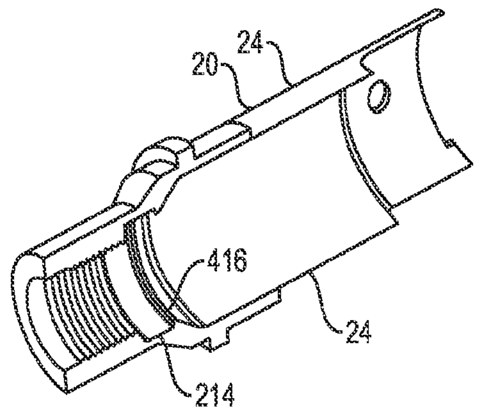
FIG. 4 is a further enlarged diagrammatic cutaway view, in perspective, of an embodiment of a barrel housing that can form part of the contact of FIGS. 1-3.

Attention is now directed to FIG. 3 which is a diagrammatic exploded view, in perspective, of an embodiment of contact 10 that is provided for purposes of illustrating the various components that make up its overall structure. An opto-electronic converter 200 is appropriately configured to generate light in the instance of a TOSA embodiment or to receive light in the instance of a ROSA embodiment, as described above. The converter, by way of example, can include electrical interface pins 202 for external electrical connection. The converter also includes ferrule 100 supported for optical communication with an internally supported component which is shown in a subsequent figure. Ferrule 100 can be formed, for example, as a molded ceramic from any suitable material. A precision alignment sleeve 204 can be provided in a split configuration to be slidingly received on ferrule 100, interposed between alignment sleeve retainer cap 26 and the ferrule itself. The alignment sleeve can have a length along elongation axis 22 (FIG. 1) that is longer than the protruding length of ferrule 100 such that the tip of the ferrule is housed and supported within sleeve 204. In this regard, an outward end of the precision alignment sleeve is identified by the reference number 210 in FIG. 2. Thus, opposing ferrule 94 extends into alignment sleeve 204 when contact 90 is mated with contact 10 with the intent of physically contacting ferrule 100, and thus enabling optical communication between the tips of the respective ferrules. FIG. 4 is a further enlarged and partially cut-away view of barrel housing 20 shown here to illustrate further details of its structure. In particular, the barrel housing defines an annular groove 214 that is configured for supporting opto-electronic converter 200 in a manner that is yet to be described.

In some embodiments, one or more components illustrated in FIGS. 3, 4, e.g., converter 200, pins 202, sleeve 204, may be or include a metal. Any such metal components may be composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components may have a magnetic permeability that is non-magnetic (e.g., a value of less than 1.0 B/H (or less than about)). Further, nonmagnetic components may be treated using passivation processes to create a microcoating protection against corrosion. AOC assembly may employ a number of PCB technologies applicable to creating nonmagnetic solutions including but not limited to hot air surface level (HASL), electroless nickel immersion gold (ENIG), copper palladium immersion gold (CPIG), immersion silver (IS) and organic solder preservation (OSP) processes.

Figure 5:
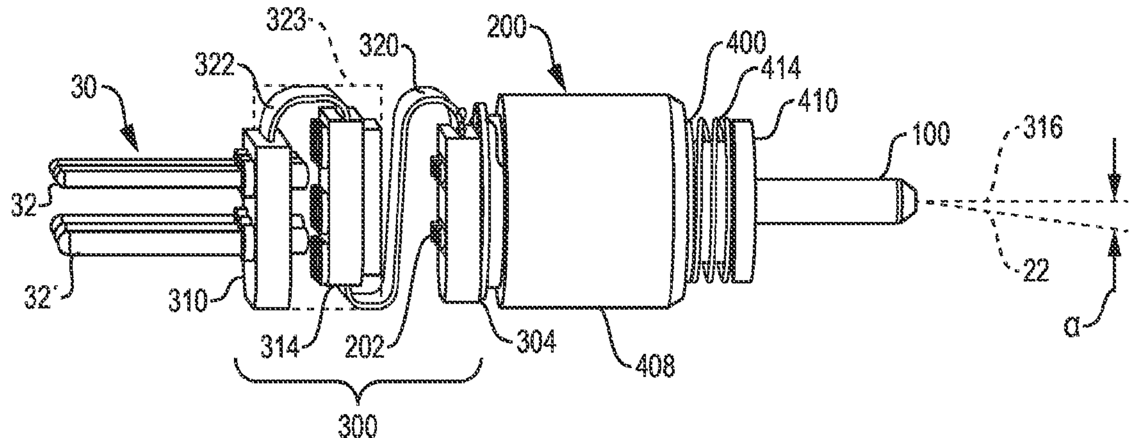
FIG. 5 is a diagrammatic view, in perspective, of an assembly including an opto-electronic converter and flexible circuit board assembly that can be used in embodiments of the contact of the present disclosure such as, for example, those of FIGS. 1-3.

Referring now to FIG. 5, attention is now directed to further details with respect to opto-electronic converter 200 and a flexible circuit board assembly 300 that is used to interface the opto-electronic converter to the outside world via external electrical connection interface 30 which, in an embodiment, supports an arrangement of electrically conductive pins 32. In this regard, a particular pin 32' can include an enlarged diameter or other suitable feature for indexing purposes. The flexible circuit board assembly includes an internal electrical connection end 304 for connection to electrical interface pins 202 of the converter and an external electrical connection end 310 for connection to electrically conductive pins 32. A middle section 314 can be supported transversely or orthogonally to an elongation axis 316, shown as a dashed line, of the converter using the flexible circuit board assembly. Generally, elongation axis 316 of the converter can coincide with elongation axis 22 of the barrel housing when the converter is installed in the barrel housing, although this is not a requirement. As will be further described, however, mating contact 10 with opposing contact 90 typically produces misalignment between these two axes since both the contact and the opposing contact are configured to float in a way that provides for relative movement or float that accommodates this misalignment to avoid damaging components of the contact and/or components of the opposing contact. In the present embodiment, the flexible circuit board assembly includes a first flex extension 320, extending from internal electrical connection end 304 to middle section 314, and a second flex extension 322 extending from external electrical connection end 310 to middle section 314. First flex extension 320, in the present embodiment, includes two 180° bends such that the extension passes transversely through the elongation axis of the overall assembly whereas second flex extension 322 defines one 180° bend such that a total of 540° of bending is defined. In this regard, however, it should be appreciated that the flex extensions can be configured in any suitable manner and the configuration is not limited to the described embodiment.

As seen in FIG. 1, the opto-electronic converter and flexible circuit board assembly are configured to be received in the interior cavity of barrel housing 20 such that pins 32 extend outward from the barrel housing for purposes of forming an external electrical connection, although in other embodiments such an external electrical connection can be formed in different ways, as will be further described. When installed, the flexible circuit board assembly is fixedly attached at internal connection end 304 and external connection end 310 such that converter 200 can move relative to barrel housing 20. In this regard, external connection end 310 can be fixedly supported at the electrical connection end of the barrel housing in a suitable manner such as, for example, using an adhesive material or potting compound which can also form an environmental seal between the barrel housing and the external electrical connection end. Suitable adhesives and/or potting compounds include, but are not limited to epoxy, and RTV sealant as well as suitable combinations thereof. At the same time, and as will be further described, flex extensions 320 and 322, and middle section 314, depending on the extents of any potting compound that is used, can move relative to the barrel housing responsive to relative movement of converter 200. It should be appreciated that flex extension 320 can be configured, in an embodiment, to provide for more than adequate relative movement even when middle section 314 and an initial portion of flex extension 320 proximate to the middle section are encased in potting compound wherein potting compound 323 is indicated by a dashed line in FIG. 5.

Referring collectively to FIGS. 3-5, relative movement between barrel housing 20 and converter 200, in addition to the use of flexible circuit board assembly 300, is facilitated by the manner in which the barrel housing supports the converter. In the present embodiment, a retention clip 400 includes an annular configuration that is receivable around a collar 402 (best seen in FIG. 3) that is defined between a main body 408 of the converter and a flange 410 which terminates the collar. An indexing feature 412, indicated by dashed lines, can be formed, for example, as part of a peripheral outline of the converter body to cooperate with a complementary feature that can be defined on the interior of the barrel housing. Examples of suitable indexing features include but are limited to one or more slots or projections arranged around the periphery of the converter body. Such indexing is useful, for example, when an angle polished ferrule (APC) is used as ferrule 100 for purposes of establishing the rotational orientation of the converter, and thereby the ferrule, to within some tolerance of a known position. Indexing feature(s) 412 can cooperate with flats 24 (see FIGS. 1, 3 and 4) to ensure that the opto-electronic contact is placed into a known rotational orientation in confronting opposing contact 90, as seen in FIG. 2.

The retention clip can be formed, for example, from a suitably resilient material such as, for example, spring steel, or beryllium-copper in a "C" configuration such that the retention clip can be installed on the collar by spreading the opening in the C shape. The retention clip is shown as installed in FIG. 5 and is slidingly received on collar 402. The inside diameter of the retention clip can be sized to provide a suitable amount of clearance relative to the collar such that the plane of the retention clip can twist and form an angle relative to elongation axis 316 of the converter for reasons which will be made evident. In the present embodiment, a coil spring 414 is also installed on collar 402 such that the coil spring is captured between collar 402 and retention clip 400. Converter 200 can be received in the cavity of barrel housing 20 with retention clip 400 biased against a shoulder 416 (FIG. 4) of the barrel housing. This type of embodiment can be acceptable in situations where the opposing contact incorporates adequate spring travel and force to cause effective physical contact of the opposing optical ferrules in the fully-mated condition, under all conditions, including mechanical tolerances, thermal expansion, vibration, shock, and the like. In some embodiments, there may be a need to perform lifecycle durability evaluations that measure the impact of material changes of spring 414 on the fiber optic ferrules and housings themselves. Spring shoulders may be placed on boss features on the FO ferrules which travel in the cavities of the connector housings, which needs to be re-qualified. Typical components of the requalification test plan would include vibration, shock, mating durability, mating force, thermal cycling and humidity cycling tests among others.

Figure 6:
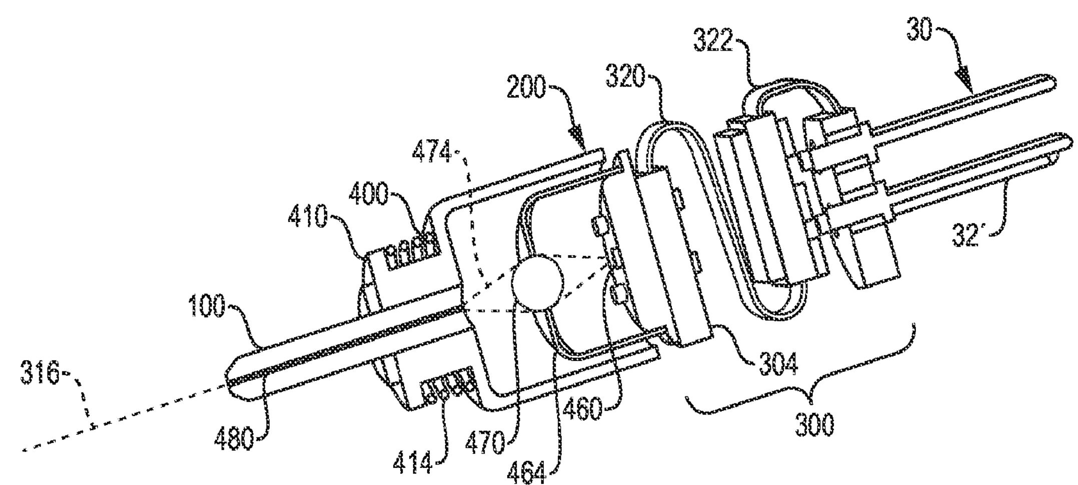
FIG. 6 is another diagrammatic view, in perspective, of the assembly of FIG. 5 shown as partially cutaway to reveal details of its internal structure.

FIG. 6 is another diagrammatic view, in perspective, of the embodiments of opto-electronic converter 200 and flexible circuit board assembly 300 shown in FIG. 5. In this instance, however, converter 200 is shown as partially cut-away to reveal details of its internal structure. In particular, converter 200 includes an optical converter element 460 such as, for example, a laser diode (e.g., a vertical-cavity surface-emitting laser (VCSEL)) or solid state detector that is supported in an internal housing 464 and suitably electrically interfaced to interface pins 202 of the converter. Housing 464, in an embodiment, can be in the form of a well-known Transistor Outline (TO) package such as a TO-46 package that supports a lens 470. While any suitable lens can be used (e.g., Spherical and Graded Refractive Index (GRIN) lenses), the present embodiment illustrates the use of a ball lens with ray traces 474 included to illustrate optical coupling and focusing between optical converter element 460 and a confronting end of an optical fiber 480 that is supported by ferrule 100. In the present embodiment, the distal/exterior end of fiber 480 and ferrule 100 are flat polished while the interior end can be angle-polished, for example, at a suitable angle such as at least approximately 8 degrees to direct reflections outside of the overall optical path that is defined by the assembly.

In some embodiments, one or more components illustrated in FIGS. 5, 6, e.g., clip 400, collar 402, flange 410, spring 414, element 460, housing 464, may be or include a metal. Any such metal components may be composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components may have a magnetic permeability that is non-magnetic (e.g., a value of less than 1.0 B/H (or less than about)). Further, nonmagnetic components may be treated using passivation processes to create a microcoating protection against corrosion. AOC assembly may employ a number of PCB technologies applicable to creating nonmagnetic solutions including but not limited to hot air surface level (HASL), electroless nickel immersion gold (ENIG), copper palladium immersion gold (CPIG), immersion silver (IS) and organic solder preservation (OSP) processes.

In some embodiments, AOC assembly includes an enhanced Digital Diagnostic Monitoring Interface, which employs a general purpose optical transceiver module or converter 200. The interface may be operationally connected to opto-electronic converter 200 and/or circuit board assembly 300. The interface allows real time access to device operating parameters, and includes a system of alarm and warning flags which alerts the host system when operating parameters are outside of normal operating range (factory set). The interface may utilize proprietary elements such as embedded microcontroller and non-volatile memory and discrete electrical components to implement diagnostics, reporting, signal detection and status information. The interface may further allow for subsystem adjustments, such as adjustable bias current control, based on reported real-time/run-time values including but not limited to: RX power monitoring, TX power monitoring, bias current monitoring, supply voltage monitoring and temperature monitoring. The reporting mechanism may be designed for in-band and/or out-of-band (e.g. sideband) usage models. The transceiver generates this diagnostic data by digitization of internal analog signals. One design goal will be to provide alarms for failed systems and real time stats for predictive maintenance.

Figure 7:
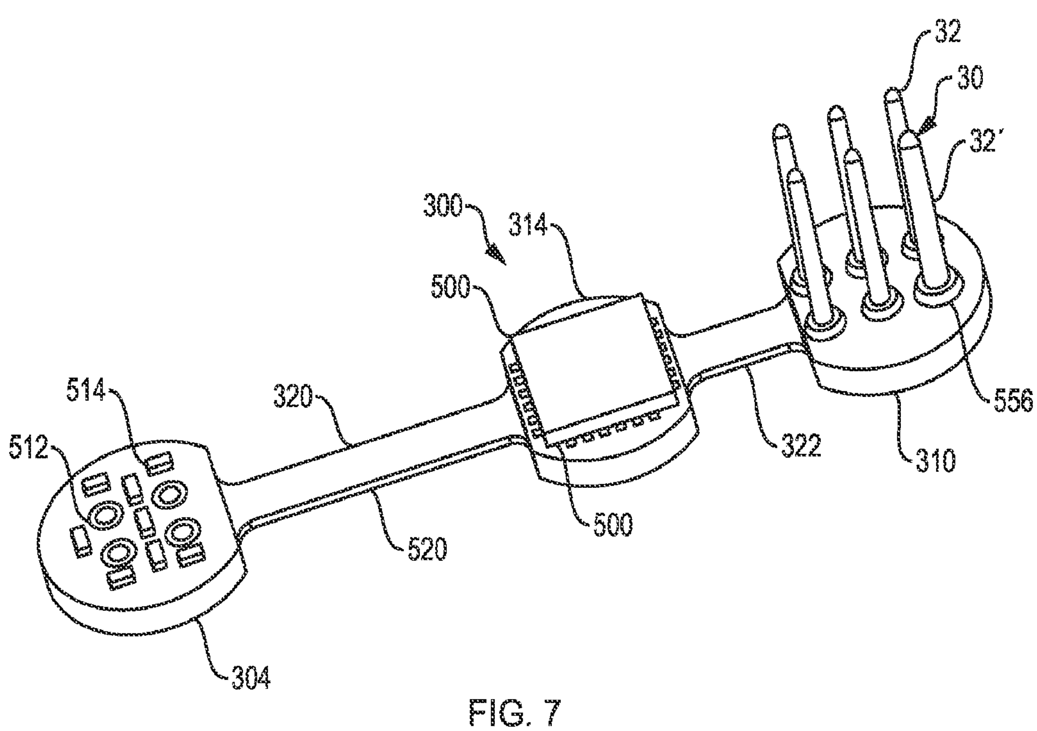
FIGS. 7 and 8 are diagrammatic views, in perspective, showing details of a flexible circuit board assembly that can be used in embodiments of the contact of the present disclosure.
Figure 8:
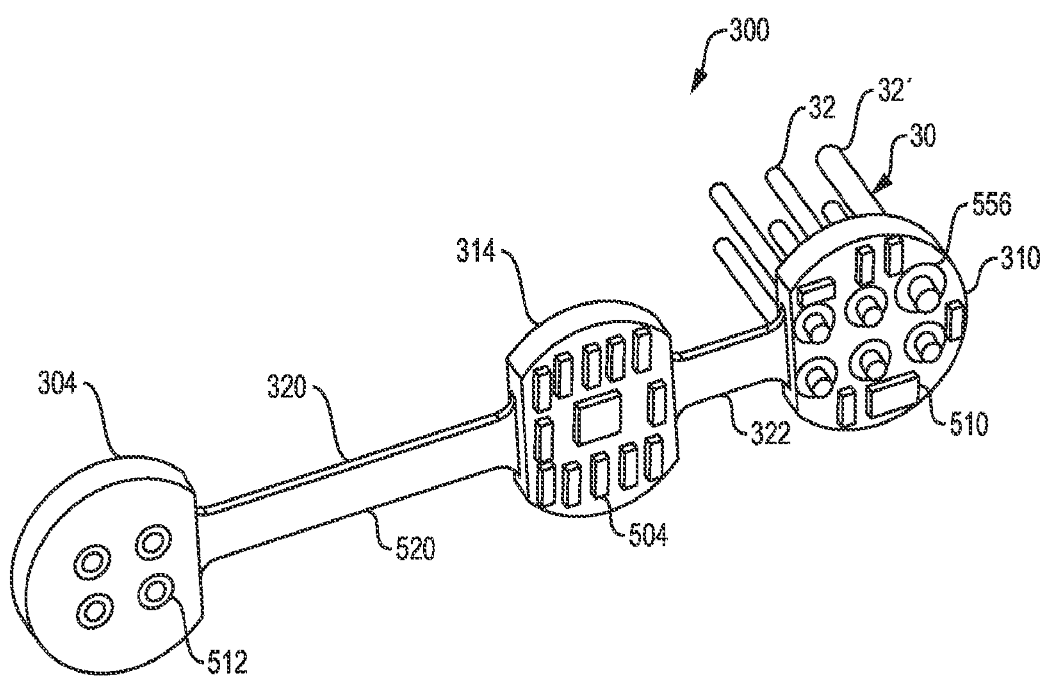

Attention is now directed to FIGS. 7 and 8 which are diagrammatic views, in perspective, of flexible circuit board assembly 300 showing each of the opposing major surfaces of the assembly in a planar form for purposes of illustrating details of its structure. In this regard, it should be appreciated that first flex extension 320 between internal electrical connection end 304 and middle section 314 is significantly longer than second flex extension 322 between external electrical connection end 310 and middle section 314 to support bending as shown in FIGS. 3, 5 and 6, although other bending arrangements may be found to be suitable. Middle circuit section 314 can support an amplifier 500, as seen in FIG. 7. In the case of opto-electronic converter 200 including a light emitting element such as a laser diode (e.g., a vertical-cavity surface-emitting laser (VCSEL)), amplifier 500 can be a driver amplifier. On the other hand, in the case of opto-electronic converter 200 including a light detector or receiver element such as a photodiode, amplifier 500 can be a limiting amplifier. The middle section on the side opposite of amplifier 500, as seen in FIG. 8, can support any suitable arrangement of electrical components 504 such as, for example, passive components such as, for example, passive electrical components for purposes which include but are not limited to decoupling or impedance-matching of data transmission lines, biasing of the opto-electronic device, and electrical tuning or filtering. In the instance of a driver amplifier, the electrical connection to external connection end 310 can be by way of differential drive such that at least some of passive components 504 can be used to terminate the differential drive arrangement in its characteristic impedance. For a laser diode that is intended to operate over a wide temperature range, at least some of components 504 can be passive components that are directed to providing temperature compensation. External electrical connection end 310 supports electrically conductive pins 32 which can be laid out in any suitable manner, as will be further discussed. In an embodiment, pin 32' can serve as a ground pin and be of an enlarged diameter or any other suitable shape/configuration relative to the other pins to serve an indexing function. As seen in FIG. 8, the external electrical connection end can support electrical components 510 such as, for example, passive electrical components for purposes which can include, but are not limited to de-coupling, tuning and/or impedance-matching of the electrical data transmission lines, and filtering of electrical input power lines. Internal electrical connection end 304 is configured to engage the electrical interface arrangement of opto-electronic converter 200 such as, for example, interface pins 202 (FIG. 3) using a pattern of through holes 512 each of which can be surrounded by an electrically conductive trace. In an embodiment, pins 202 can be soldered to internal electrical interface arrangement 304. In some embodiments, the internal electrical interface arrangement can support electrical components 514 (FIG. 7) such as, for example, passive electrical components for purposes which include but are not limited to decoupling or impedance-matching of data transmission lines, biasing of the opto-electronic device, and electrical tuning or filtering.

Figure 9:
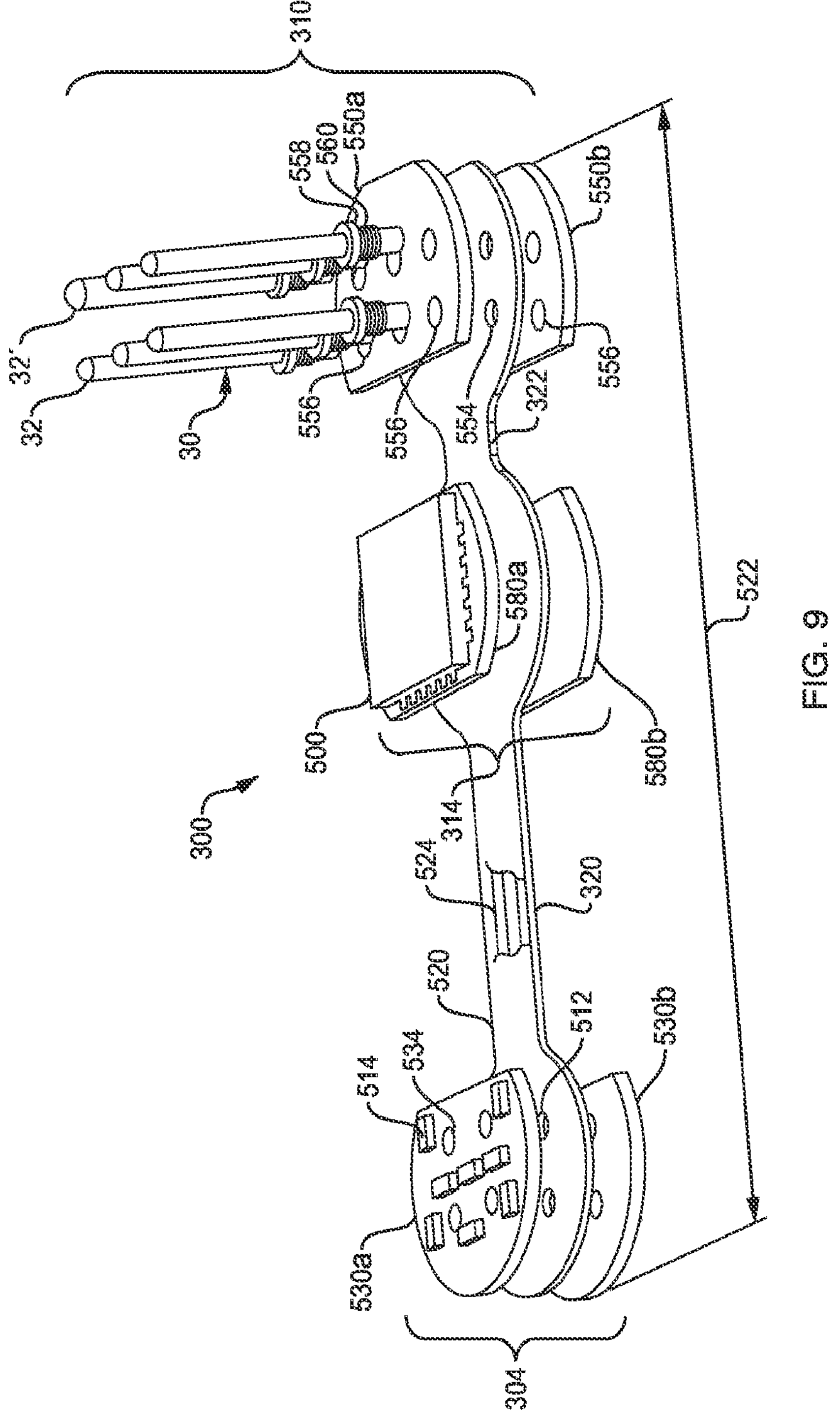
FIG. 9 is a diagrammatic exploded view, in perspective, of an embodiment of the flexible circuit board assembly of the present disclosure, shown here to illustrate details with respect to the use of a flexible circuit board substrate in a sandwiched/layered overall structure.

Attention is now directed to FIG. 9, which is a diagrammatic exploded view, in perspective, of an embodiment of flexible circuit board assembly 300, shown here to illustrate still further details of its structure. In particular, a flexible circuit substrate 520 includes an elongated length 522 that can extend along the full end-to-end length of the assembly. Flexible substrate 520 can be formed from any suitable material such as, for example, polyimide or “Kapton”, and can support electrically conductive traces 524 (diagrammatically shown) that are laid out in a desired pattern for purposes of forming electrical connections. In the present embodiment, a sandwich construction is applied for purposes of forming internal electrical connection end 304, external connection end 310, and middle section 314. Internal connection end 304 can include first and second circuit boards 530*a* and 530*b* arranged on opposing sides of flexible substrate 520. Boards 530*a* and 530*b* can be formed from any suitable material such as, for example, FR4 and patterned with electrically conductive traces for electrical communication with cooperative electrically conductive traces defined on flexible substrate 520. Through holes 534, with surrounding electrically conductive traces, can be arranged to align with through holes 512 of the flexible substrate to receive electrically conductive pins 202 of the opto-electronic converter. Boards 530*a* and 530*b* can be fixedly attached to the flexible substrate, for example, by solder and/or suitable adhesives. In another embodiment, the internal electrical connection end of the flexible substrate can be attached to pins 202 without using rigid circuit boards or using only one of the rigid circuit boards. In this regard, flexible substrate 520 can directly support electrical components 514. Moreover, in another embodiment, the entire circuit board may be comprised of a flexible substrate only, with no rigid sections, onto which electrical amplifier 500 and other electrical components 514 may be directly affixed by solder and/or suitable adhesives.

Still referring to FIG. 9, external connection end 310 can be configured including opposing rigid circuit boards 550*a* and 550*b* in the manner described above for the internal connection end. Openings 554 defined in the external connection end of the flexible substrate align with openings 556 of boards 550*a* and 550*b* to receive pins 32 and 32' subsequent to attachment of boards 550*a* and 550*b* to the flexible substrate. In an embodiment, pins 32 and 32' can be installed in the external connection end using a pressed-fit. In such an embodiment, the pins can include an annular shoulder 558 and a patterned region 560 such as, for example, a splined configuration which accommodates the pressed fit, or a "swage" type of construction. After the pins are pressed into the external connection end, solder can be applied to electrically connect the pins to electrically conductive patterns on each of boards 550*a* and 550*b* as well as to the pattern on flexible substrate 520. It should be appreciated that the use of a pressed-fit, in the present embodiment, establishes the pin positions in a way that is resistant to shifting of the pins during soldering. In this regard, maintaining the pins in predetermined positions or at least within some desired tolerance from such predetermined positions can ensure ease of installation of the pins of interface 30 into circuit board 70 of FIG. 2 while avoiding damage to the pins and/or circuit board 70. Another benefit is provided with respect to flexibility in the installation pattern of the pins of interface 30. Since the pins are installed through the major surfaces of boards 550*a* and 550*b*, there are few constraints on the pin locations.

Middle section 314 can be configured including opposing rigid circuit boards 580*a* and 580*b* in the manner described above for the internal and external connection ends. Printed circuit board 580*a* can be patterned based on the requirements of amplifier 500 whereas printed circuit board 580*b* can be patterned to support any additional electrical components that are needed such as, for example, passive components including any suitable arrangement or combination of resistors, capacitors and/or inductors 504 (see FIG. 8). With continuing reference to FIG. 9, in other embodiments, one or both of first flex extension 320 and second flexible extension 322 can be individually formed and electrically connected, for example, by soldering, to a rigid printed circuit board that serves as any one of the internal connection end, the external connection end and/or the middle section.

In some embodiments, one or more components illustrated in FIGS. 7-9 and described above may be or include a metal. Any such metal components may be composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components may have a magnetic permeability that is non-magnetic (e.g., a value of less than 1.0 B/H (or less than about)). Further, nonmagnetic components may be treated using passivation processes to create a microcoating protection against corrosion. AOC assembly may employ a number of PCB technologies applicable to creating nonmagnetic solutions including but not limited to hot air surface level (HASL), electroless nickel immersion gold (ENIG), copper palladium immersion gold (CPIG), immersion silver (IS) and organic solder preservation (OSP) processes.

Figure 10:
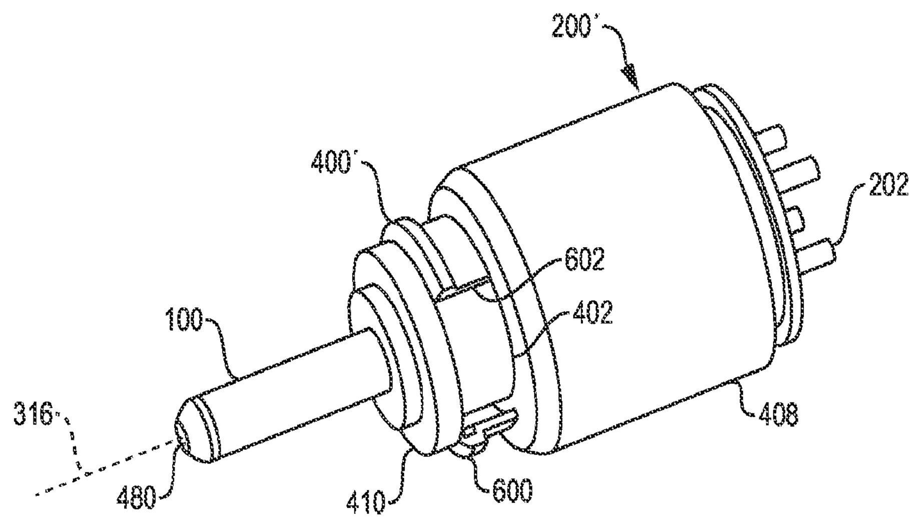
FIG. 10 is a diagrammatic view, in perspective, of another embodiment of an opto-electronic converter according to the present disclosure.

Attention is now directed to FIG. 10 which illustrates another embodiment of an opto-electronic converter, indicated by the reference number 200' which can be used in contact 10 of FIGS. 1-3. Converter 200' is shown in a diagrammatic, perspective view. The present discussion is limited to those features which differentiate converter 200' from previously described converter 200 for purposes of brevity. The reader is directed to the discussion of converter 200, which appears above, for details with respect to components and features that are shared by the two embodiments under immediate consideration. Converter 200' includes a retention clip 400' installed on collar 402 without the use of a resilient biasing element such as previously described coil spring 414. Clip 400' can include an annular rim 600 that is configured to be received in annular groove 214 (FIG. 4) of barrel housing 20, for example, by receiving clip 400' into groove 214. Clip 400' can include a skirt 602, extending from annular rim 600 and having a length along the axis of the converter that is based on the axial length of collar 402 such that predetermined tolerances are established between clip 400', collar 402 and flange 410. These tolerances provide for movement of converter 200' relative to barrel housing 20 such that the converter can float relative to the barrel housing when another contact such as, for example, opposing contact 90 of FIG. 2 is engaged. It is noted that the opposing/confronting ends of clip 400', which define a gap therebetween for purposes of installing the clip onto collar 402, can be spaced apart by any suitable angular offset. Clip 400' can be formed from any suitable material such as, for example, tempered spring steel or beryllium-copper.

Figure 11:
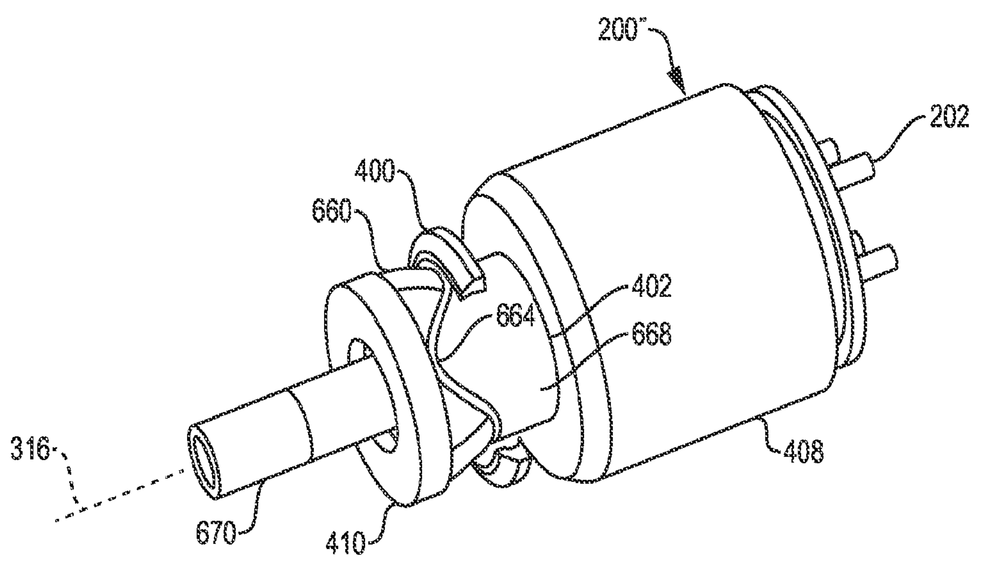
FIG. 11 is another diagrammatic view, in perspective, of still another embodiment of an opto-electronic converter according to the present disclosure.

Turning to FIG. 11, another embodiment of an opto-electronic converter, generally indicated by the reference number 200" is shown in a diagrammatic, perspective view. Like converter 200', converter 200" can be used in contact 10 of FIGS. 1-3. Accordingly, the present discussion is limited to those features which differentiate converter 200" from previously described converters 200 and 200' for purposes of brevity. The reader is directed to the discussion of converters 200 and 200', which appear above, for details with respect to shared components and features that are illustrated. Converter 200" can include previously described retention clip 400 installed on collar 402. In the present embodiment, however, a wave spring 660 is received on collar 402 such that the wave spring is captured between retention clip 400 and flange 410. Wave spring 660 can be installed on collar 402 in the manner described above with regard to helical coil spring 414 by spreading the opposing ends of the wave spring apart to a degree that allows installation on the collar. As described above, retention clip 400 is resiliently receivable in groove 214 (FIG. 4) such that axial movement of converter 200" can occur relative to barrel housing 20 much in the same manner as is provided by previously described coil spring 414. Responsive to compression that displaces converter 200" further into the barrel housing, the opposing ends of the wave spring can move toward one another and/or overlap. In the present embodiment, a gap 664 between the opposing ends of the wave spring can be aligned with a gap 668 between the opposing ends of clip 400, although this is not a requirement. The wave spring, for a given axial length of collar 402 can provide for a relative increase in the amount of axial movement that is available for the converter relative to the housing since the wave spring can be compressed to essentially the thickness of the material from which it is formed, whereas a coil spring can compress only to the point that adjacent coils of the spring are in physical contact. In this regard, it should also be noted that the axial length of collar 402 can be customized based on the use of a given type of spring and the amount of axial movement that is to be provided. Wave spring 660 can be formed from any suitable material including, but not limited to tempered spring steel or beryllium-copper. The use of the wave spring provides for the same relative movement of the converter relative to the barrel housing in addition to resiliently biased axial movement. For example, the converter can also move in any direction radially transverse to axis 22 (FIG. 1) of the barrel housing. Further, as shown in FIG. 5, like ferrule 100, an optical communication end 670 can twist or rotate to form aforedescribed angle alpha. (FIG. 5) that is defined between elongation axis 316 of the converter and elongation axis 22 of the barrel housing. It should be apparent through a comparison of FIGS. 10 and 11, that another difference with respect to converter 200" resides in the configuration of optical communication end 670 which internally supports ferrule 100 (FIGS. 2, 3, 5, 6 and 10), as will be described in further detail immediately hereinafter.

In some embodiments, one or more components illustrated in FIGS. 10, 11 and described above may be or include a metal. Any such metal components may be composed of a base metal layer, subplating metal layer and final plating metal layer. The material of the base metal layer, subplating metal layer and final plating metal layer may be selected from the list comprising or consisting of non-magnetic metals: aluminum, silver, tin, phosphor bronze, brass, copper, gold, lead, titanium, silicon bronze, cobalt-chromium, beryllium copper, non-magnetic stainless steel and various alloy combinations thereof. In some embodiments, any metal components may have a magnetic permeability that is non-magnetic (e.g., a value of less than 1.0 B/H (or less than about)). Further, nonmagnetic components may be treated using passivation processes to create a microcoating protection against corrosion. AOC assembly may employ a number of PCB technologies applicable to creating nonmagnetic solutions including but not limited to hot air surface level (HASL), electroless nickel immersion gold (ENIG), copper palladium immersion gold (CPIG), immersion silver (IS) and organic solder preservation (OSP) processes.

Figure 12:
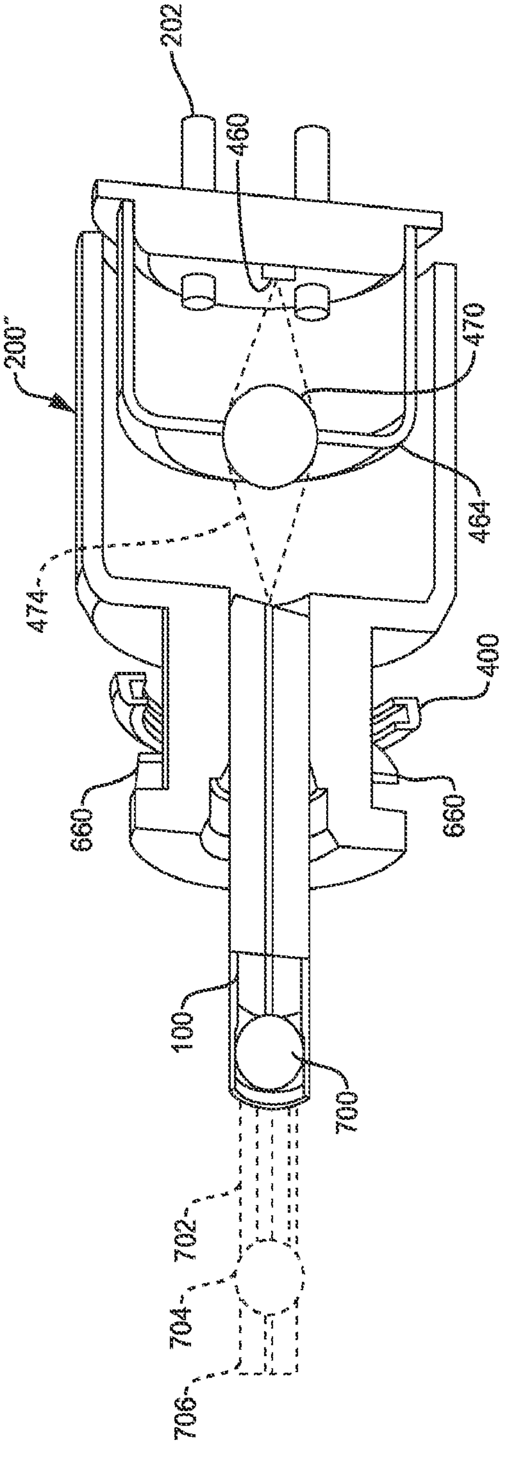
FIG. 12 is a diagrammatic partially cutaway view, in perspective, showing the internal structure of the opto-electronic converter of FIG. 11 in relation to selected external optical elements.

FIG. 12 is a diagrammatic cutaway view, in perspective, which illustrates further details of converter 200" of FIG. 11. Initially, it is noted that converter 200 of FIG. 3 is supported such that the end face or tip of ferrule 100 can physically contact the tip of an opposing ferrule to provide for optical communication therebetween. Converter 200", however, is configured for use in a free space collimated configuration having a collimating lens 700 in contact, or near contact, with the tip of ferrule 100 such that light 702, which can be collimated to a degree that is sufficient for optical coupling purposes, can travel through an empty cavity between collimating lens 700 and an opposing collimating lens 704, shown in phantom using dashed lines, that is itself in optical communication with an opposing ferrule 706, with the latter only partially shown and illustrated in phantom using dashed lines. It should be appreciated that light 702 can be traveling in either direction and that collimating lens 704 and opposing collimating lens 700, in general, are selected to couple to and from the collimated light beam 702 of predetermined characteristics. Therefore, they may be identically constructed lenses, or different, depending on the type of fiber being used on each side of light beam 702, or other design constraints. In an embodiment, these lenses can be ball lenses. In another embodiment, these lenses can be graded-index (GRIN) lenses or any suitable type of lens.

Figure 13:
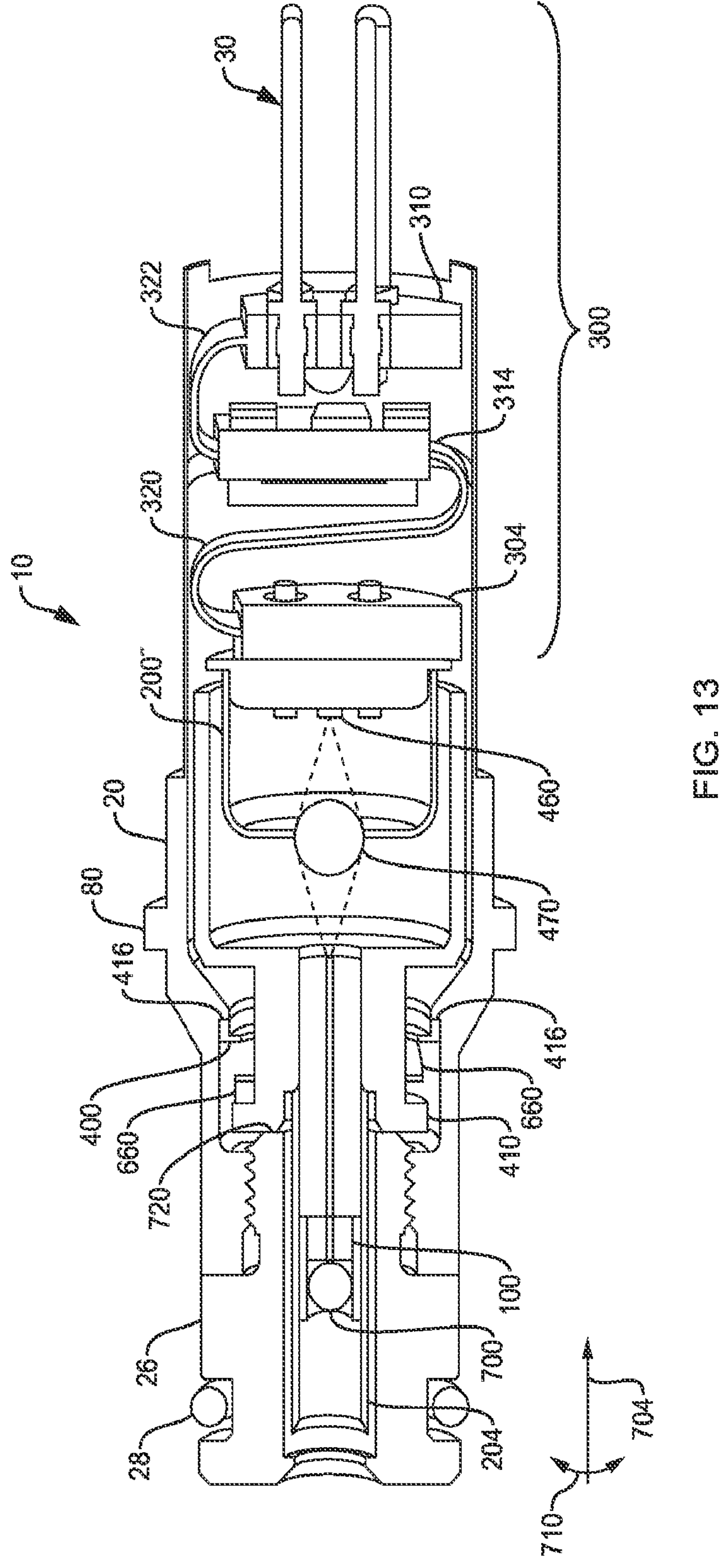
FIG. 13 is a diagrammatic partially cutaway view, in perspective, illustrating an assembled embodiment of an opto-electronic contact according to the present disclosure using, by way of non-limiting example, the opto-electronic converter of FIGS. 11 and 12.

Referring to FIG. 13 in conjunction with FIGS. 11 and 12, the former is a diagrammatic cutaway view in elevation of contact 10 supporting opto-electronic converter 200" of FIG. 12. It should be appreciated that the contact varies little in appearance when either converter 200 or converter 200' are installed, hence these additional views have not been provided for purposes of brevity. Exceptions in the appearance of these figures would entail deleting collimating lens 700 and modifying the appearance of precision alignment sleeve 204, as well as changing the appearance of the retention clip and associated spring that are used, depending on the particular embodiment. It is noted that the assembly is shown in an unmated state such that retention clip 400 is resiliently biased against shoulder 416 (see also FIG. 4) by wave spring 660. At the same time, flange 410 is received against an inner surface 720 of alignment sleeve retainer cap 26. Mating contact 10 with an opposing contact generally causes some combination of axial movement in the direction indicated by an arrow 704, lateral/radial movement orthogonal to the axial movement and angular twisting indicated by an arc 710. The combined movement provides for substantially reduced exposure of the components of contact 10, as well as the opposing contact, to damage. Components that can be sensitive to damage include any precision alignment sleeves that are in use. By damaging such components, the optical coupling performance can be compromised, for example, by increasing coupling losses. Accordingly, contact 10 provides a sweeping improvement over prior art contacts such as are taught, for example, by the '849 patent.

DDMI can be present within the AOC assembly. DDMI can be useful in diagnosing various performance issues within the AOC cabling and/or within the larger system in which the AOC connection is used. However, DDMI can be prone to cause increased EMI noise in industrial applications. This increased noise reduces the signal to noise ratio, which can result in artifacts when the AOC cabling is used in imaging applications such as Magnetic Resonance Imaging (MRI) machines. This reduced signal to noise ratio reduces the length of cabling that can be used in the system, as longer cables also reduce the signal to noise ratio, and the combined noise from the monitoring and from the length of the cable means that shorter cabling must be used. This requirement to use shorter cabling can make imaging applications with DDMI inconvenient to use.

Having described a number of embodiments above, it should be appreciated that a heretofore unseen opto-electronic contact, associated method and connection system have been brought to light by the present disclosure. Such a contact can include an active opto-electronic converter including a converter length extending between opposing first and second ends to define a converter axis having the first end configured for removable optical engagement with an opposing contact. A housing such as, for example, a barrel housing can define an interior cavity having an elongated length extending between opposing first and second barrel openings to define an elongation axis and having the opto-electronic converter captured in the interior cavity for external optical engagement to the opposing contact via the first barrel opening for relative movement of the converter axis along the elongation axis, transverse thereto, and oblique thereto to accommodate mating tolerances responsive to engaging the opposing contact. In an embodiment, a flexible circuit board assembly includes an internal electrical connection end, an external electrical connection end and an elongated length extending therebetween. The internal connection end electrically engages the converter and the external connection end can be fixedly positioned proximate to the second barrel opening for external electrical connection to the opto-electronic contact such that the external connection end is positioned on the elongation axis at a distance from the second end of the opto-electronic contact that is less than the elongated length of the flexible circuit board and the elongated length is captured within the interior cavity of the barrel housing.

The foregoing description has been presented for purposes of illustration and description. Accordingly, the present application is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. An opto-electronic connector comprising:

a housing having a cavity, the housing configured to support an electrical connection at a first end of the housing and support an optical connection at a second end of the housing;

an opto-electronic module disposed at least partially in the cavity of the housing, the opto-electronic module including an opto-electronic transceiver, an electrical interface to provide an electrical connection to the opto-electronic module via the first end of the housing, a ferrule, and a lens, wherein the ferrule and the lens are to provide an optical connection to the opto-electronic module via the second end of the housing, wherein the housing, the opto-electronic module, the opto-electronic transceiver, the electrical interface, and the ferrule have a magnetic permeability that is less than 1.0 B/H, where B is magnetic flux density and His magnetic flux.

2. The opto-electronic connector of claim 1, wherein each of the housing, the opto-electronic module, the opto-electronic transceiver, the electrical interface, and the ferrule includes a metal component selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

3. The opto-electronic connector of claim 2, wherein the metal component includes a base metal layer selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

4. The opto-electronic connector of claim 3, wherein the metal component further includes a subplating metal layer selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

5. The opto-electronic connector of claim 4, wherein the metal component further includes a final plating metal layer selected from the group consisting of aluminum, silver, tin, phosphor bronze, brass, copper, gold, lead, titanium, silicon bronze, cobalt-chromium, beryllium copper, non-magnetic stainless steel and various alloy combinations thereof.

6. The opto-electronic connector of claim 2, wherein the opto-electronic transceiver includes a laser diode.

7. The opto-electronic connector of claim 6, wherein the laser diode includes a vertical-cavity surface-emitting laser (VCSEL).

8. The opto-electronic connector of claim 2, wherein the opto-electronic transceiver includes a photodiode.

9. The opto-electronic connector of claim 7, wherein the opto-electronic connector is configured as a small form-factor pluggable (SFP) or SFP+module.

10. The opto-electronic connector of claim 9, further comprising a flexible circuit board assembly, the flexible circuit board assembly comprising an internal electrical connection end;

a middle section;

an external electrical connection end a first flex extension, extending from the internal electrical connection end to the middle section, and a second flex extension extending from the external electrical connection end to the middle section.

11. The opto-electronic connector of claim 10, wherein the first flex extension comprises a first bend, and wherein the second flex extension comprises a second bend.

12. The opto-electronic connector of claim 11, wherein the flexible circuit board assembly is configured to be received in the cavity, and wherein the flexible circuit board assembly is fixedly attached at the internal connection end and the external connection end.

13. The opto-electronic connector of claim 12, wherein the external connection end is fixedly supported at the first end.

14. The opto-electronic connector of claim 1, further comprising a retention clip, wherein the retention clip includes an annular configuration that is receivable around a collar that is defined between a main body of the opto-electronic connector, and a flange, wherein the flange terminates the collar.

15. The opto-electronic connector of claim 14, wherein the retention clip is slidingly received on the collar, and wherein an inside diameter of the retention clip is sized to provide a suitable amount of clearance relative to the collar such that a plane of the retention clip can twist and form an angle relative to an elongation axis of the opto-electric connector.

16. The opto-electronic connector of claim 14, further comprising a wave spring positioned to be captured between the retention clip and the flange, wherein the housing further comprises a shoulder, wherein the retention clip is positioned to be biased against the shoulder by the wave spring, and wherein the flange is configured to be received against an inner surface of an alignment sleeve retainer cap.

17. The opto-electronic connector of claim 14, wherein each of the retention clip, the collar and the flange includes the metal component of claim 2.

18. The opto-electronic connector of claim 1, wherein the lens is a collimating lens, and wherein the collimating lens is in contact or in near contact with the ferrule.

19. The opto-electronic connector of claim 17, further comprising an opposing collimating lens, wherein the collimating lens is in optical communication with an opposing ferrule, and wherein the opto-electronic connector is configured so that light can travel through an empty cavity between the collimating lens and the opposing collimating lens.

20. The opto-electronic connector of claim 1, wherein each of the housing, the opto-electronic module, the opto-electronic transceiver, the electrical interface, and the ferrule includes a metal component selected from the group consisting of cobalt, chromium, nickel, iron, molybdenum, manganese, carbon, and various alloy combinations thereof.

* * * * *